United States Patent
Oike et al.

(10) Patent No.: US 10,709,211 B2
(45) Date of Patent: Jul. 14, 2020

(54) INTERLOCKING MEANS AND BAG WITH INTERLOCKING MEANS

(71) Applicant: C.I. TAIKRON Corporation, Osaka (JP)

(72) Inventors: Takayuki Oike, Osaka (JP); Masayuki Obayashi, Osaka (JP)

(73) Assignee: C.I. TAIKRON CORPORATION, Osaka (JP)

( * ) Notice: Subject to any disclaimer, the term of this patent is extended or adjusted under 35 U.S.C. 154(b) by 22 days.

(21) Appl. No.: 15/740,521

(22) PCT Filed: Mar. 9, 2016

(86) PCT No.: PCT/JP2016/057394
§ 371 (c)(1),
(2) Date: Dec. 28, 2017

(87) PCT Pub. No.: WO2017/006584
PCT Pub. Date: Jan. 12, 2017

(65) Prior Publication Data
US 2018/0184767 A1    Jul. 5, 2018

(30) Foreign Application Priority Data

Jul. 9, 2015 (JP) .................................. 2015-137689

(51) Int. Cl.
*A44B 19/00* (2006.01)
*A44B 19/16* (2006.01)
(Continued)

(52) U.S. Cl.
CPC ................ *A44B 19/16* (2013.01); *B29D 5/00* (2013.01); *B65D 33/25* (2013.01); *B65D 33/255* (2013.01);
(Continued)

(58) Field of Classification Search
CPC ........ A44B 19/16; B29D 5/00; B65D 33/255; B65D 33/25; B65D 33/2558; B29L 2031/7128
(Continued)

(56) References Cited

U.S. PATENT DOCUMENTS 5,070,584 A * 12/1991 Dais .......................... B26F 1/12
24/400
5,138,750 A * 8/1992 Gundlach ............ B65D 33/255
24/403
(Continued)

FOREIGN PATENT DOCUMENTS

EP    0510797 A1    10/1992
EP    2735522 A1    5/2014
(Continued)

OTHER PUBLICATIONS

International Search Report in International Application No. PCT/JP2016/057394, dated May 24, 2016.
(Continued)

*Primary Examiner* — Peter N Helvey
(74) *Attorney, Agent, or Firm* — Knobbe, Martens, Olson & Bear LLP

(57) ABSTRACT

An interlocking means including a first interlocking member for which a male interlocking part is provided in a longitudinal direction of a band-shaped first base and a second interlocking member for which a female interlocking part is provided in a longitudinal direction of a band-shaped second base, and in which multiple sections whose heights are low are formed at the female interlocking part at intervals in a longitudinal direction of the female interlocking part, and the male interlocking part and the female interlocking part are interlocked in the low sections in the same manner as in (Continued)

the non-low sections; and a hag with an interlocking means in which the interlocking means is provided.

5 Claims, 7 Drawing Sheets

(51) Int. Cl.
 *B65D 33/25* (2006.01)
 *B29D 5/00* (2006.01)
 *B65D 75/58* (2006.01)
 *B29L 31/00* (2006.01)
(52) U.S. Cl.
 CPC .. *B65D 33/2558* (2013.01); *B29L 2031/7128* (2013.01); *B65D 33/2566* (2013.01); *B65D 75/5805* (2013.01); *B65D 2203/12* (2013.01)
(58) Field of Classification Search
 USPC ........................................................ 383/61.2
 See application file for complete search history.

(56) References Cited

U.S. PATENT DOCUMENTS

| | | | | |
|---|---|---|---|---|
| 5,140,727 | A * | 8/1992 | Dais | ..................... B65D 33/255 |
| | | | | 24/400 |
| 5,398,387 | A * | 3/1995 | Torigoe | .............. A44B 18/0053 |
| | | | | 24/452 |
| 7,585,111 | B2 | 9/2009 | Turvey et al. | |
| 2003/0033694 | A1 | 2/2003 | Cisek | |
| 2006/0008184 | A1 * | 1/2006 | Borchardt | .......... B65D 33/2541 |
| | | | | 383/63 |
| 2006/0269169 | A1 | 11/2006 | Kettner et al. | |
| 2012/0027322 | A1 * | 2/2012 | Ackerman | .............. A44B 19/16 |
| | | | | 383/64 |
| 2012/0106875 | A1 | 5/2012 | Pawloski | |
| 2012/0301056 | A1 * | 11/2012 | Anzini | ..................... B29D 5/10 |
| | | | | 383/61.2 |
| 2013/0207311 | A1 * | 8/2013 | Plourde | .................... B29D 5/10 |
| | | | | 264/299 |

FOREIGN PATENT DOCUMENTS

| | | |
|---|---|---|
| JP | A-63-055061 | 3/1988 |
| JP | U-A-03-017050 | 2/1991 |
| JP | A-05-137606 | 6/1993 |
| JP | A-11-501890 | 2/1999 |
| JP | A-2003-160149 | 6/2003 |
| JP | A-2010-120190 | 6/2010 |
| JP | A-2010-137866 | 6/2010 |
| JP | A-2011-036642 | 2/2011 |
| WO | WO 96/028063 A1 | 9/1996 |
| WO | WO 2012/075007 A1 | 6/2012 |

OTHER PUBLICATIONS

Office Action in Japanese Patent Application No. 2016-135356, dated Nov. 5, 2019.

Search Report issued in European Patent Application No. 16821055.7, dated Nov. 30, 2018.

* cited by examiner

INTERLOCKING MEANS AND BAG WITH INTERLOCKING MEANS

TECHNICAL FIELD

The present invention relates to an interlocking means and a bag with the interlocking means.

Priority is claimed on Japanese Patent Application No. 2015-137689, filed on Jul. 9, 2015, the content of which is incorporated herein by reference.

BACKGROUND ART

A bag with an interlocking means attached to an inner surface around an opening of a bag main body to seal the opening such that it can be freely closed and reopened is widely used in various fields such as foods, drugs, sundries, and so on. In an example of the interlocking means, first and second interlocking parts, which are detachably interlocked with opposite surfaces of a pair of band-shaped bases, are provided in longitudinal directions of the bases.

For example, an interlocking means in which both the first interlocking part and the second interlocking part have a plurality of male hook parts running parallel to each other, and heads of the mutual male hook parts are inserted between two opposite female hook parts are mutually hooked to be attached/detached is known (Patent Document 1).

In this bag with an interlocking means, the first and second interlocking parts of the interlocking means are interlocked, and thereby the opening formed in the bag can be closed. The bag can be reopened by grasping opening ends of the bag main body to which the interlocking means is attached, pulling them away from each other, and releasing the interlocking between the first interlocking part and the second interlocking part.

When the opening is closed by the interlocking means in the bag with an interlocking means, the first and second interlocking parts are generally partly interlocked at a lateral end side of the bag first. Afterward, by holding the interlocked portion between one's fingers and sliding the fingers along the interlocking means, the first and second interlocking parts are continuously locked up to a lateral end of the opposite side. In this case, the first and second interlocking parts are interlocked at portions at which the first and second interlocking parts are interlocked first, which can be recognized with fingers by touch. However, it is difficult to recognize with fingers by touch whether or not interlocking is successful when the first and second interlocking parts are continuously interlocked by sliding the fingers. For this reason, the opening of the bag may be unintentionally left partly opened. If the interlocking between the first interlocking part and the second interlocking part is insufficient in portions, when the internal pressure of the bag is increased, the interlocking is partly released by the internal pressure, and the bag may open.

As a method for making it easy to recognize the interlocking between the first interlocking part and the second interlocking part with a sense of the fingers, a method for increasing interlocking strength between the first interlocking part and the second interlocking part is considered. However, as the interlocking strength increases, it is more difficult to interlock the first interlocking part and the second interlocking part, and a handling characteristic of the bag is reduced.

An interlocking means in which detachably interlocked male and female interlocking parts are provided on opposite surfaces of a pair of band-shaped bases in longitudinal directions of the bases, a plurality of cutout parts are formed in the male interlocking parts at intervals in a lengthwise direction, and thereby the male interlocking parts are discontinuous, is known (Patent Document 2). When the interlocking means is used, since the male interlocking parts become intermittent, it is possible to sense that the interlocking is happening with one's fingers when the male and female interlocking parts are continuously interlocked while sliding the fingers. However, in a bag with an interlocking means for which the interlocking means is provided, when liquid or powdered contents are stored, there is a problem that the contents leak out through the cutout parts of the male interlocking part.

CITATION LIST

Patent Document

[Patent Document 1]
Japanese Unexamined Patent Application, First Publication No. S63-055061
[Patent Document 2]
Japanese Unexamined Patent Application, First Publication No. 2010-120190

SUMMARY OF INVENTION

Technical Problem

An object of the present invention is to provide a bag with an interlocking means in which full interlocking of male and female interlocking parts is easily recognized, opening/closing is easy, and leakage of even liquid or powdered contents stored in the bag can be inhibited.

Solution to Problem

[1] An interlocking means includes a pair of band-shaped first and second interlocking members. The first interlocking member includes a band-shaped first base and a male interlocking part that is provided in a longitudinal direction of the first base, and the second interlocking member includes a band-shaped second base and a female interlocking part that is provided in a longitudinal direction of the second base and is detachably interlocked with the male interlocking part. A plurality of low sections whose heights are low are formed at the female interlocking part at intervals in a lengthwise direction of the female interlocking part, and the male interlocking part and the female interlocking part are also interlocked in the low sections.

[2] The interlocking means described in [1] has a constitution in which interlocking strength between the male interlocking part and portions other than the low sections at the female interlocking part at a side disposed at a content side of a bag exceeds 30 N.

[3] The interlocking means described in [1] or [2] has a constitution in which the interlocking strength between the male interlocking part and the low sections at the female interlocking part at the side disposed at the content side of the bag exceeds 10 N.

[4] A bag with an interlocking means includes a bag main body in which contents are stored, and the interlocking means described in any one of [1] to [3] which is attached to an inner surface of the bag main body.

Advantageous Effects of Invention

When the interlocking means of the present invention is used, full interlocking of male and female parts is easily recognized, opening/closing is easy, and leakage of even liquid or powdered contents stored in the bag can be inhibited.

In the bag with an interlocking means of the present invention, full interlocking of male and female parts is easily recognized, opening/closing is easy, and leakage of even liquid or powdered contents stored in the bag can be inhibited.

DESCRIPTION OF EMBODIMENTS

[Interlocking Means]

Hereinafter, an example of an interlocking means of the present invention will be described in detail.

Figure 1:
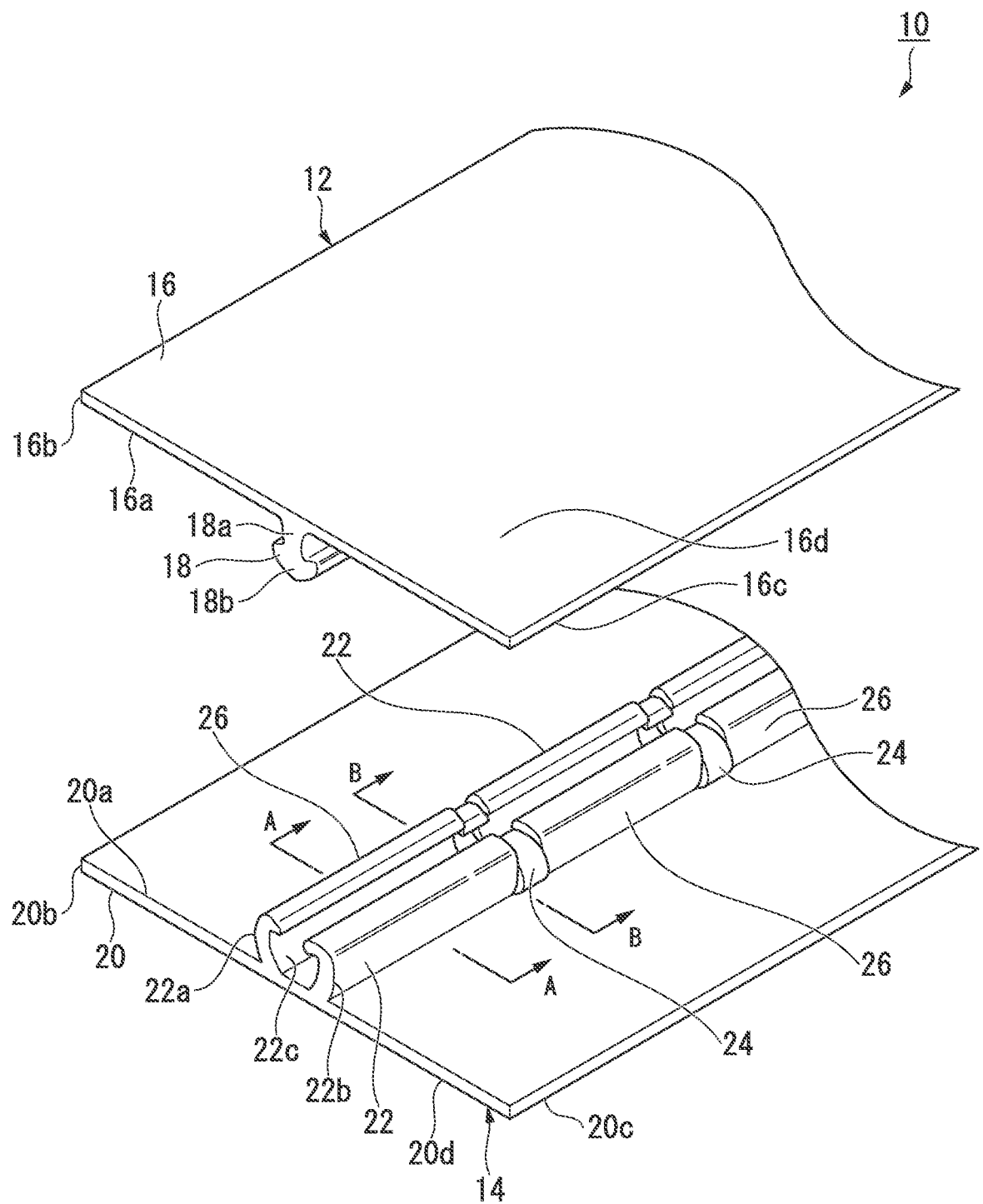
FIG. 1 is a perspective view showing an example of an interlocking means of the present invention.
Figure 2:
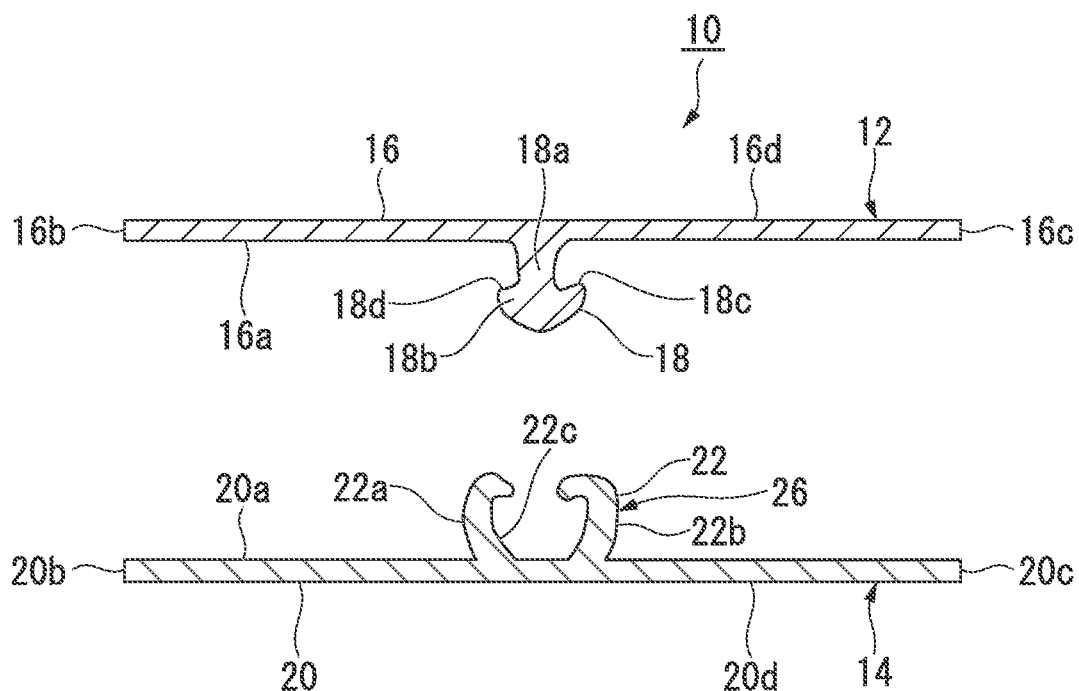
FIG. 2 is a sectional view taken along line A-A of the interlocking means of FIG. 1.
Figure 3:
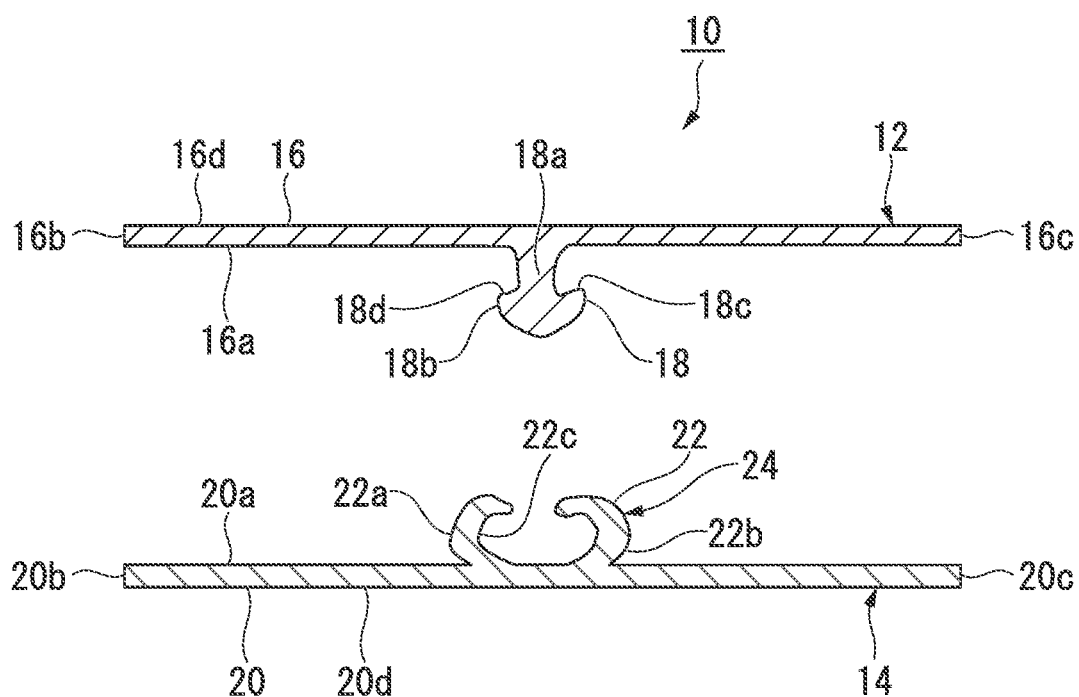
FIG. 3 is a sectional view taken along line B-B of the interlocking means of FIG. 1.

As shown in FIGS. 1 to 3, an interlocking means 10 includes a pair of band-shaped first and second interlocking members 12 and 14. The first interlocking member 12 includes a band-shaped first base 16 and a male interlocking part 18 provided in a longitudinal direction of the first base 16. The second interlocking member 14 includes a band-shaped second base 20 and a female interlocking part 22 provided in a longitudinal direction of the second base 20.

The interlocking means 10 of the present embodiment is attached to an inner surface of a bag main body such that a first lateral end 16b of the first base 16 and a first lateral end 20b of the second base 20 are at an opening side of the bag, and a second lateral end 16c of the first base 16 and a second lateral end 20c of the second base 20 are at a content side of the bag.

(First Interlocking Member)

The first base 16 is not particularly limited, and a material used for a base of a well-known interlocking means may be used for the first base 16. A base formed of a laminated film is preferred as the first base. The laminated film may include, for example, a film on which a heat-resistant layer and a heat seal layer are laminated from an opposite surface side facing the second base.

The first base 16 may have a barrier layer between the heat-resistant layer and the heat seal layer.

A material of the heat-resistant layer may include biaxially stretched nylon, biaxially stretched polypropylene, or the like.

A material of the heat seal layer may include linear low-density polyethylene, unstretched polypropylene, an ethylene-vinyl acetate copolymer, an ionomer, or the like.

A material of the barrier layer may include polyvinyl alcohol or the like.

The first base 16 may be formed of a single resin, or a resin composition containing two or more resins. A well-known additive such as a stabilizer, an antioxidant, a lubricant, an antistat, a colorant, etc. may be added as needed.

The first base 16 is not limited to the base formed of a laminated film, and may be a base formed of a single-layered film.

As shown in FIGS. 1 to 3, the male interlocking part 18 includes a stem part 18a that is erected from an opposite surface 16a of the first base 16, and a head part 18b that is provided at a tip side of the stem part 18a and is larger than the stem part 18a. The head part 18b of the male interlocking part 18 is fitted into a concave part 22c of the female interlocking part 22 (to be described below).

The head part 18b in the male interlocking part 18 of the present embodiment has a shape in which a portion 18c close to the second lateral end 16c at the content side in the bag protrudes to be larger than a portion 18d close to the first lateral end 16b at the opening side. Thereby, as will be described below, in a state in which the male interlocking part 18 and the female interlocking part 22 are interlocked in the bag, the content side is configured such that, in comparison with the opening side, interlocking strength becomes higher, and the interlocking between the male interlocking part 18 and the female interlocking part 22 is less easily released even when an internal pressure of the bag increases. In addition, on the opening side, the interlocking strength becomes relatively low, and the interlocking between the male interlocking part 18 and the female interlocking part 22 can be easily released by applying force with one's hands.

The male interlocking part 18 need only have a shape that can be interlocked with the female interlocking part 22, and a well-known shape can be adopted.

A material of the male interlocking part 18 is not particularly limited, and for example, the same materials listed for the first base 16 may be used.

(Second Interlocking Member)

The second base 20 is not particularly limited, and includes the same base as, for instance, the first base 16. The second base 20 is also the same preferred mode as the first base 16.

The female interlocking part 22 includes pairs of first and second arm parts 22a and 22b that are erected from an opposite surface 20a facing the first base 16 in the second base 20 in a cross-sectional shape of a circular arc.

A concave part 22c extending between the first arm parts 22a and the second arm parts 22b in a lengthwise direction of the second base 20 is defined at the female interlocking part 22 by the first and second arm parts 22a and 22b.

Figure 4:
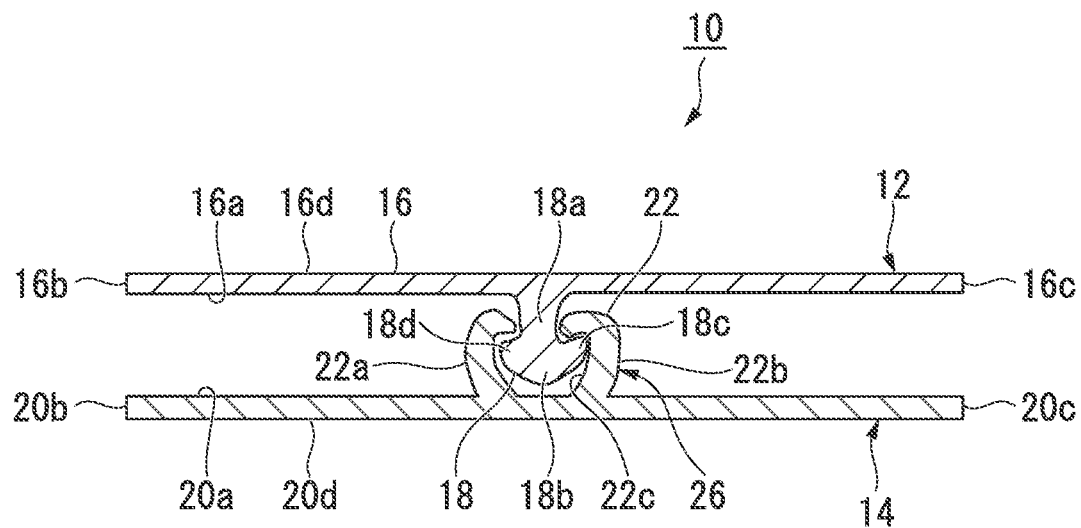
FIG. 4 is a sectional view showing an interlocked state of the interlocking means of FIG. 2.

As shown in FIG. 4, the head part 18b of the male interlocking part 18 is fitted into the concave part 22c of the female interlocking part 22. The head part 18b of the male interlocking part 18 is locked at tip portions of the first and second arm parts 22a and 22b of the female interlocking part 22, and thereby the male interlocking part 18 and the female interlocking part 22 are interlocked. The interlocked male interlocking part 18 is displaced to be separated from the female interlocking part 22, and thereby the head part 18b of the male interlocking part 18 is detached while forcibly spreading the first and second arm parts 22a and 22b of the female interlocking part 22 from an inner side. In this way, the male interlocking part 18 and the female interlocking part 22 are detachably interlocked.

As shown in FIGS. 1 to 3, a plurality of low sections 24 whose heights are low are formed at the female interlocking part 22 at intervals in a lengthwise direction of the female interlocking part 22. As shown in FIGS. 1 to 3, the low sections 24 are lower in height and wider in width, compared to non-low sections 26 that are portions other than the low sections 24 in the female interlocking part 22. In this way, the low sections 24 are formed in a crushed shape such that the female interlocking part 22 becomes partly lower.

The widths of the low sections in the female interlocking part may be identical to those of the non-low sections.

Since the plurality of low sections 24 are formed at intervals in the lengthwise direction of the female interlocking part 22, a plurality of steps are formed at the female interlocking part 22 in the lengthwise direction. Thereby, when the male interlocking part 18 and the female interlocking part 22 are partly interlocked and are continuously interlocked by holding the partly interlocked portion with one's fingers and sliding them, a sense of the interlocking is transferred to the fingers whenever the fingers go over one of the steps of the female interlocking part 22. A popping sound is given off when the male interlocking part 18 and the female interlocking part 22 are interlocked whenever the fingers go over one of the steps of the female interlocking part 22. Thereby, it can be recognized by the sense of the fingers and the sound whether or not the interlocking between the male interlocking part 18 and the female interlocking part 22 smoothly progresses in the lengthwise direction.

Figure 5:
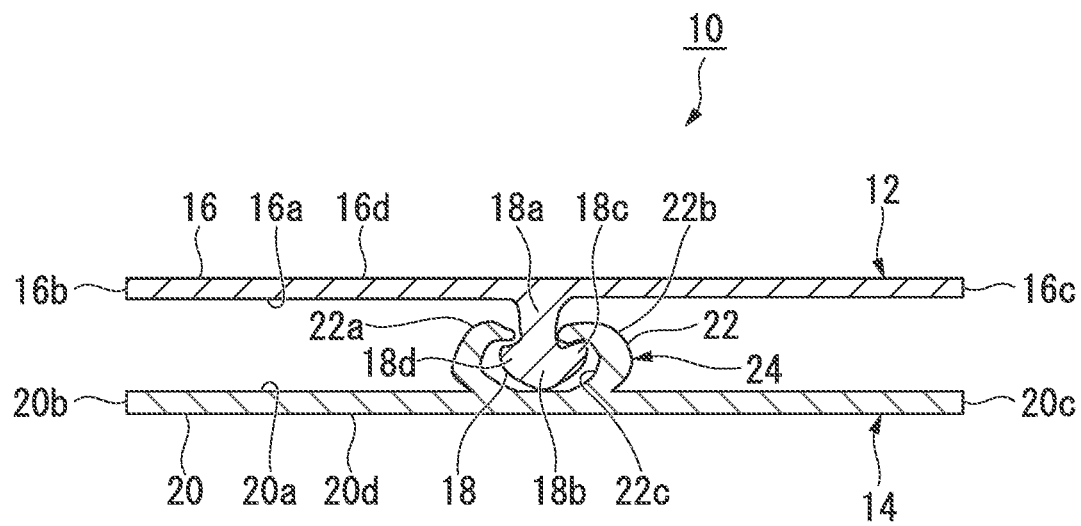
FIG. 5 is a sectional view showing an interlocked state of the interlocking means of FIG. 3.

In the state in which the male interlocking part 18 and the female interlocking part 22 are interlocked, as shown in FIG. 5, the head part 18b of the male interlocking part 18 is also in a state in which it is fitted into and interlocked with the concave part 22c of the female interlocking part 22 in the low sections 24 of the female interlocking part 22. Thereby, even when the liquid or powdered contents are stored in the bag using the interlocking means 10, the contents are inhibited from leaking through portions at which the low sections 24 of the female interlocking part 22 are located.

Interlocking strength of the male interlocking part and the non-low sections of the female interlocking part (hereinafter referred to as interlocking strength A) preferably exceeds 30 N on the side on which the male interlocking part and the non-low sections of the female interlocking part are disposed on the content side of the bag. In the present embodiment, the interlocking strength A of the male interlocking part 18 and the second arm parts 22b in the non-low sections 26 of the female interlocking part 22 preferably exceeds 30 N. If the interlocking strength A exceeds 30 N, the interlocking is easily maintained even when a pressure is applied to the interlocked portion between the male interlocking part and the female interlocking part from the content side.

The interlocking strength A has no particular upper limit, and is preferably higher.

The interlocking strength A is a maximum value of stress when a sample cut at a length of 50 mm is used, and the lateral end of the interlocked portion between the male interlocking part and the female interlocking part disposed on the content side of the bag in a base of the sample is interposed between two chucks of a tension tester and is pulled at a tension speed of 50 mm/minute.

A shape of the head part of the male interlocking part and shapes of the second arm parts in the non-low sections of the female interlocking part are adjusted, and thereby the interlocking strength A is adjusted.

The interlocking strength of the male interlocking part and the low sections of the female interlocking part (hereinafter referred to as interlocking strength B) preferably exceeds 10 N on the side on which the male interlocking part and the low sections of the female interlocking part are disposed on the content side of the bag. In the present embodiment, the interlocking strength B of the male interlocking part 18 and the second arm parts 22b in the low sections 24 of the female interlocking part 22 preferably exceeds 10 N. If the interlocking strength B exceeds 10 N, the interlocking is easily maintained even when a pressure is applied to the interlocked portion between the male interlocking part and the female interlocking part from the content side.

The interlocking strength B has no particular upper limit, and is preferably higher.

The interlocking strength B may be measured by the same method as the interlocking strength A.

The shape of the head part of the male interlocking part and the shapes of the second arm parts in the low sections of the female interlocking part are adjusted, and thereby the interlocking strength B is adjusted.

The ratio of the height of the second arm part 22b in the low section 24 to the height of the second arm part 22b in the non-low section 26 of the female interlocking part 22 is preferably 7/10 to 9/10, and more preferably 15/20 to 17/20. If the ratio is more than or equal to a lower value, the interlocking strength B can easily be increased. Even when liquid or powdered contents are stored in the bag using the interlocking means 10, the contents are easily inhibited from leaking through portions at which the low sections 24 of the female interlocking part 22 are located. If the ratio is less than or equal to the upper value, a shock transferred to the fingers when the male interlocking part 18 and the female interlocking part 22 are interlocked becomes stronger, and the sound also gets louder. Thus, it is easier to recognize that the interlocking smoothly progresses.

The ratio of the height of the first arm part 22a in the low section 24 to the height of the first arm part 22a in the non-low section 26 of the female interlocking part 22 is also the same.

Aside from formation of the low sections 24, the shape of the female interlocking part 22 need only be a shape with which the opening and closing of the opening of the bag main body can be repeated by attaching and detaching the male interlocking part 18 and the female interlocking part 22.

The material of the female interlocking part 22 is not particularly limited, and for example, the same materials listed for the first base 16 may be used.

A method of producing the interlocking means of the present invention is not particularly limited, and a well-known method may be used.

A method of producing the first interlocking member may include, for instance, extruding or the like. A method of producing the second interlocking member may include, for instance, a method of partly crushing the female interlocking part to form the low sections using a heated bar or the like after the extruding.

In the interlocking means of the present invention described above, the plurality of low sections are formed at the female interlocking part. Thereby, it can be easily recognized by the sense of the fingers and the sound whether or not the interlocking smoothly progresses when the male interlocking part and the female interlocking part are wholly interlocked.

In the interlocking means of the present invention, since it can be easily recognized whether or not the interlocking smoothly progresses even when the interlocking strength between the male interlocking part and the female interlocking part is not excessively increased, the bag can be easily opened and closed.

In the interlocking means of the present invention, since the male interlocking part and the female interlocking part are also interlocked in the low sections, even when liquid or powdered contents are stored in the bag using the interlocking means of the present invention, leakage of the contents can be inhibited.

The interlocking means of the present invention is not limited to the aforementioned interlocking means 10.

Figure 6A:
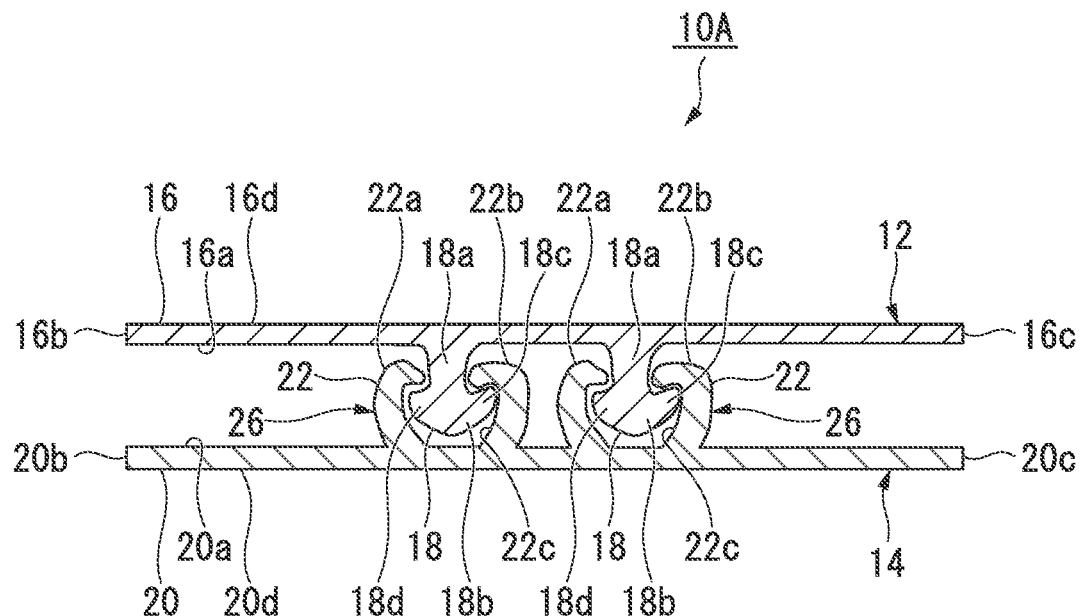
FIG. 6A is a sectional view showing another example of the interlocking means of the present invention.
Figure 6B:
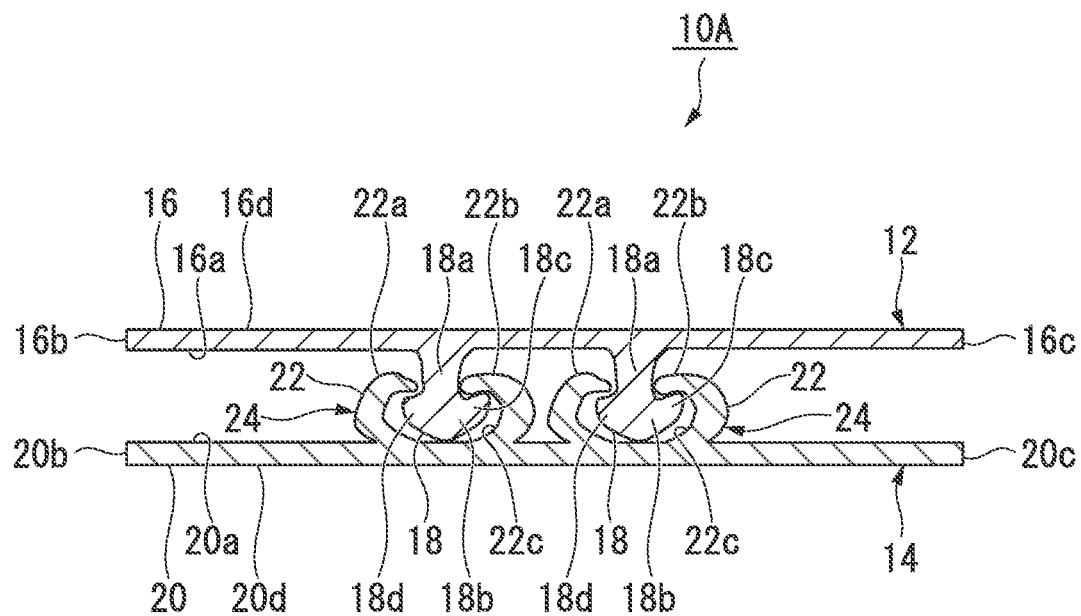
FIG. 6B is a sectional view showing the other example of the interlocking means of the present invention.

The interlocking means of the present invention is not limited to the interlocking means having the pair of male and female interlocking parts, and may have two or more pairs of male and female interlocking parts. The interlocking means of the present invention may be an interlocking means 10A shown in, for instance, FIGS. 6A and 6B. FIG. 6A is a view corresponding to the sectional view taken along line A-A of FIG. 1 in the interlocked state of the interlocking means 10A, and is similar to FIG. 4. FIG. 6B is a view corresponding to the sectional view taken along line B-B of FIG. 1 in the interlocked state of the interlocking means 10A, and is similar to FIG. 5. Accordingly, in FIGS. 6A and 6B, the same portions as in FIGS. 4 and 5 will be given the same reference signs, and a description thereof will be omitted.

The interlocking means 10A is identical to the interlocking means 10 except that two male interlocking parts 18 are provided for a first base 16 to run parallel to each other, and two female interlocking parts 22 are provided for a second base 20. In this way, the interlocking means 10A includes the two pairs of male and female interlocking parts 18 and 22.

In the interlocking means 10A, like the interlocking means 10, it can be easily recognized by the sense of the fingers and the sound whether or not interlocking smoothly progresses when the male interlocking parts and the female interlocking parts are wholly interlocked, and liquid or powered contents can be inhibited from unexpectedly leaking out of the bag.

[Bag With Interlocking Means]

As an example of a bag with an interlocking means of the present invention, a bag with an interlocking means 1 (hereinafter referred to as a "bag 1") having the aforementioned interlocking means 10 will be described.

Figure 7:
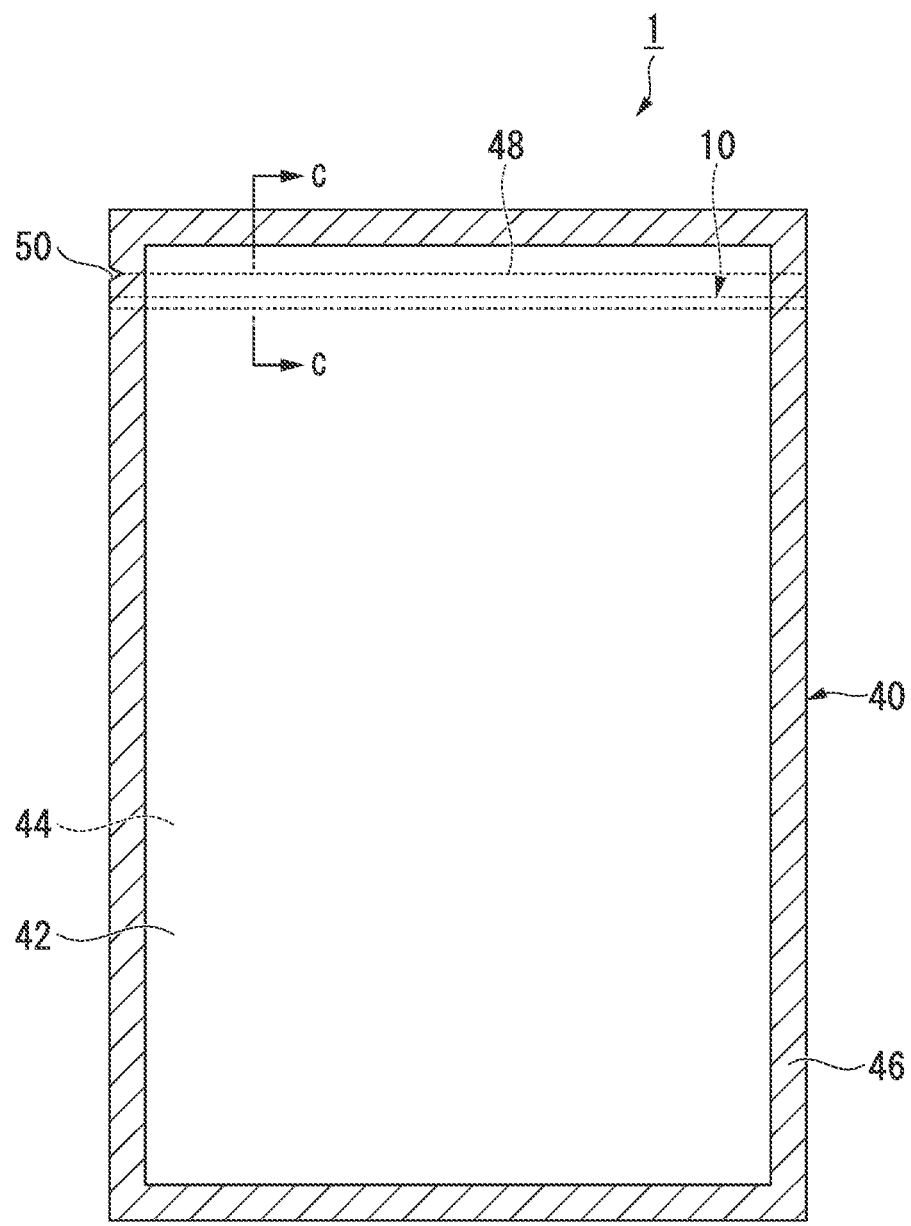
FIG. 7 is a front view showing an example of a bag with an interlocking means of the present invention.

As shown in FIG. 7, the bag 1 of the present embodiment includes a bag main body 40 that stores contents in a sealed state, and an interlocking means 10 that is attached to an upper inner surface of the bag main body 40 in a transverse direction of the bag main body 40.

A first film material 42 and a second film material 44 overlap, and all outer edges 46 thereof are heat-sealed, and thereby the bag main body 40 is formed, and is in a sealed state. A cutting auxiliary line 48 is provided in the transverse direction of the bag main body 40 at an upper side of the bag main body 40 relative to the interlocking means 10, and a notch 50 is formed at an end of the cutting auxiliary line 48.

Figure 8:
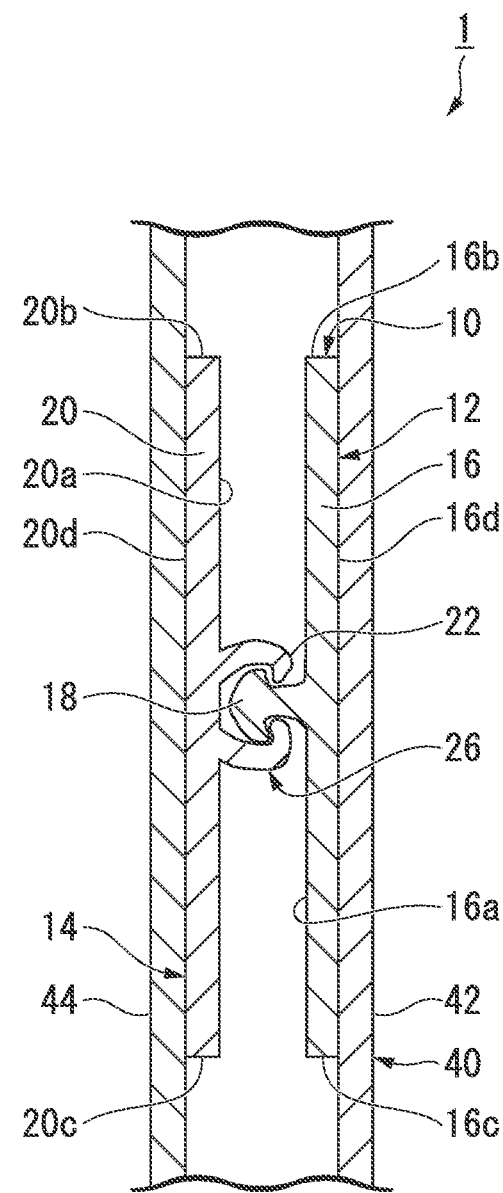
FIG. 8 is a sectional view taken along line C-C of the bag with an interlocking means of FIG. 7.

In the bag 1, as shown in FIG. 8, an outer surface 16d of a first base 16 of the interlocking means 10 is welded to the first film material 42 of the bag main body 40, and an outer surface 20d of a second base 20 of the interlocking means 10 is welded to the second film material 44 of the bag main body 40.

The shape of the bag main body 40 is a rectangular shape in the present embodiment. The shape of the bag main body 40 is not limited to the rectangular shape. The size of the bag main body 40 is not particularly limited, and may be adequately selected depending on the contents stored in the bag main body 40.

The first and second film materials 42 and 44 forming the bag main body 40 need only be materials that can weld the interlocking means 10 using a heat seal, and are preferably a laminated film having at least a sealant layer and a base layer from an inner surface side.

The base layer may include biaxially stretched nylon, biaxially stretched polypropylene, or the like.

The sealant layer may include linear low-density polyethylene, unstretched polypropylene, an ethylene-vinyl acetate copolymer, an ionomer, or the like.

A functional layer such as a barrier layer may be provided for the laminated film.

The first film material 42 and the second film material 44 may be a single film formed of only a sealant layer.

The cutting auxiliary line 48 is a line that assists in cutting and opening the bag main body 40. The cutting auxiliary line 48 may include, for instance, a weakened line that thins down a portion of the cutting auxiliary line 48 in the first and second film materials 42 and 44 of the bag main body 40 compared to portions other than the portion of the cutting auxiliary line 48, a weakened line formed of a perforation, and a weakened line made up of pores formed in a row shape. The cutting auxiliary line 48 is not limited to the weakened line, and may be a line formed by printing or the like that indicates a position to be cut with scissors or a cutter.

The cutting auxiliary line 48 is formed in a widthwise direction of the bag main body 40 in the present embodiment, but it is not limited to this embodiment, and may be provided to be inclined with respect to the widthwise direction of the bag main body 40.

A shape of the notch 50 is a triangular shape in the present embodiment, but it is not particularly limited, and may be a semi-circle shape, a straight line shape, or the like.

Figure 9:
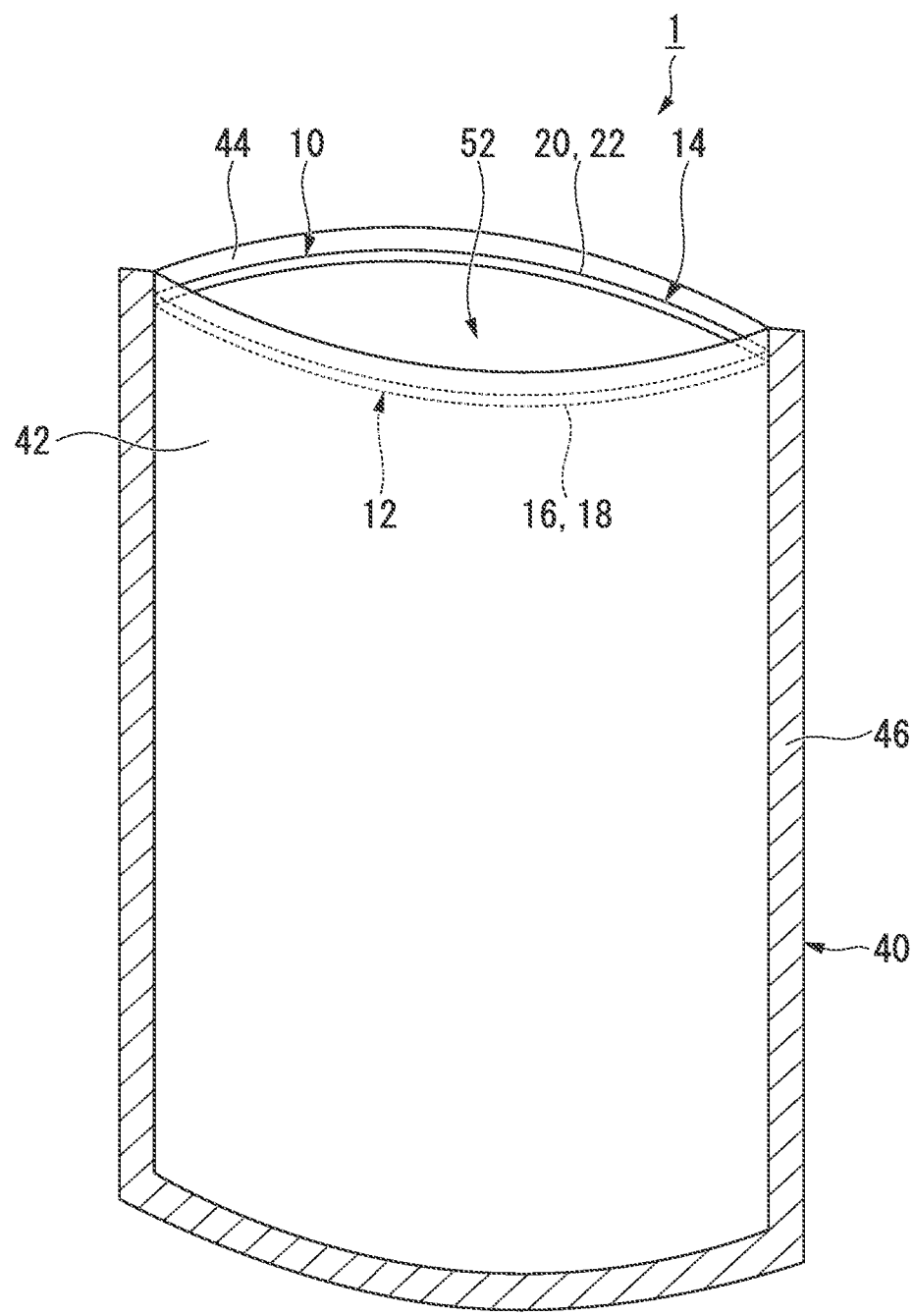
FIG. 9 is a perspective view showing a state in which the bag with an interlocking means of FIG. 7 is opened.

In the bag 1, an upper portion of the bag main body 40 is cut and removed from the notch 50 along the cutting auxiliary line 48 and thereby, as shown in FIG. 9, an opening 52 can be formed and opened at the upper portion. The opening 52 formed in the bag 1 can be repeatedly opened/closed by attaching and detaching the male and female interlocking parts 18 and 22 of the interlocking means 10.

According to the bag with an interlocking means of the present invention described above, since the interlocking means of the present invention is provided, it can be recognized from the beginning to the end by the sense of the fingers and the sound whether or not the interlocking smoothly progresses when the male interlocking part and the female interlocking part are wholly interlocked, and the opening/closing can be easily performed. Even when liquid or powdered contents are stored in the bag, the leakage of the contents can be inhibited.

The bag with an interlocking means of the present invention is not limited to the bag 1.

For example, in the bag with an interlocking means of the present invention, the bag main body is not particularly limited, and various types of bag main bodies known as bag main bodies of bags with interlocking means may be adopted. For example, the bag 1 is a bag in a sealed state until it is opened using the cutting auxiliary line 48, but it may be a bag with an interlocking means having a bag main body in which an opening is previously formed.

INDUSTRIAL APPLICABILITY

According to the present invention, the interlocking means with which full interlocking of the male and female interlocking parts can be easily recognized and leakage of liquid or powdered contents stored in the bag can be inhibited, and the bag with the interlocking means can be provided.

REFERENCE SIGNS LIST

1 Bag with interlocking means
10, 10A Interlocking means
12 First interlocking member
14 Second interlocking member
16 First base
18 Male interlocking part
20 Second base
22 Female interlocking part
24 Low section
26 Non-low section
40 Bag main body

What is claimed is:

1. An interlocking means comprising:
a pair of band-shaped first and second interlocking members;
wherein the first interlocking member includes a band-shaped first base and a male interlocking part that is provided in a longitudinal direction of the first base, and the second interlocking member includes a band-shaped second base and a female interlocking part that is provided in a longitudinal direction of the second base and is detachably interlocked with the male interlocking part, wherein
the female interlocking part includes a first plurality of sections having a first height and a second plurality of sections whose heights are lower than those of the first plurality of sections, and which are arranged at intervals in a longitudinal direction of the female interlocking part, and
the male interlocking part is interlocked with the first and second plurality of sections, respectively
wherein the second plurality of sections are in a shape that is formed by pressing and deforming the first and second interlocking members from the top such that the first and second interlocking members are outwardly deformed relative to the first and second interlocking members of the first plurality of sections, and
when the female interlocking part is viewed in a cross section in a direction orthogonal to the longitudinal direction, widths of the second plurality of sections are larger than widths of the first plurality of sections.

2. The interlocking means according to claim 1, wherein an interlocking strength between the male interlocking part and portions other than the sections whose heights are low at the female interlocking part at a side disposed at a content side of a bag exceeds 30 N.

3. The interlocking means according to claim 1, wherein the interlocking strength between the male interlocking part and the sections whose heights are low at the female interlocking part at the side disposed at the content side of the bag exceeds 10 N.

4. A bag with an interlocking means comprising a bag main body in which contents are stored, and the interlocking means according to claim 1 which is attached to an inner surface of the bag main body.

5. The interlocking means according to claim 1, wherein the female interlocking part includes a first arm part and a second arm part that is provided apart from the first arm,
the widths of the second plurality of sections is a dimension from an outer edge of the first arm part of the low sections to an outer edge of the second arm part of the second plurality of sections in an arrangement direction of the first arm part and the second arm part, and
the widths of the first plurality of sections is a dimension from an outer edge of the first arm part of the non-low sections to an outer edge of the second arm part of the first plurality of sections in the arrangement direction.

* * * * *